United States Patent [19]

Yoshioka et al.

[11] 4,348,065
[45] Sep. 7, 1982

[54] THRUST BEARING

[75] Inventors: Masahiro Yoshioka, Ibaraki; Toshifumi Koike, Shimoinayoshi, both of Japan

[73] Assignee: Hitachi, Ltd., Tokyo, Japan

[21] Appl. No.: 167,398

[22] Filed: Jul. 10, 1980

[30] Foreign Application Priority Data

Jul. 13, 1979 [JP] Japan .................. 54-88133

[51] Int. Cl.³ .................. F16C 32/06; F16C 33/10
[52] U.S. Cl. .................. 308/9; 308/170
[58] Field of Search .................. 308/9, 160, 161, 168, 308/170

[56] References Cited

U.S. PATENT DOCUMENTS 2,731,305  1/1956  Wilcock ........................ 308/160
3,827,770  8/1974  Horler ......................... 308/160
4,077,682  3/1978  Gardner ....................... 308/160

FOREIGN PATENT DOCUMENTS 585992  10/1959  Canada ........................ 308/160
436504  11/1926  Fed. Rep. of Germany ...... 308/160
194660  4/1957   Fed. Rep. of Germany ...... 308/160
48-4130  2/1973  Japan .
147070  9/1962   U.S.S.R. ...................... 308/160

OTHER PUBLICATIONS

Wilcock et al., "Bearing Design and Application", 1957, pp. 185, 186.

Primary Examiner—Richard R. Stearns
Attorney, Agent, or Firm—Craig and Antonelli

[57] ABSTRACT

A thrust bearing or tapered-land thrust bearing including a plurality of lubricant feeding nozzle holes. At least one of the nozzle holes is disposed in close proximity to the leading edge of a tapered surface of a bearing surface of the thrust bearing. By this arrangement, hot oil carryover can be minimized and the temperatures of a film of lubricant formed between the bearing surface and a thrust collar positioned there-against and a bearing body of the thrust bearing can be reduced. Thus the thrust bearing can withstand uses under high speed and high load conditions.

4 Claims, 8 Drawing Figures

THRUST BEARING

BACKGROUND OF THE INVENTION

1. Field of the Invention

This invention relates to a thrust bearing, and more particularly it deals with a tapered-land thrust bearing.

2. Description of the Prior Art

A thrust bearing, particularly a tapered-land thrust bearing, generally has on its bearing surface a plurality of tapered surfaces, flat surfaces and grooves which are arranged in the direction of rotation of a thrust collar positioned against the bearing surface. This type of tapered-land thrust bearing is known as from the publication "BEARING DESIGN AND APPLICATION" published by McGraw-Hill Book Incorporated. The tapered-land thrust bearing has been used in many applications because of its high load bearing capacity.

In the tapered-land thrust bearing of the prior art, there has generally been provided lubricant supply means which includes either peripheral grooves for supplying lubricant formed on the inner side of radial grooves interposed between the flat surfaces and tapered surfaces of the bearing for communicating the radial grooves with one another or apertures formed in the intermediate portions of the radial grooves for supplying lubricant thereto. Also, the radial grooves are each formed on the outer side thereof with throttle means for restricting the flow rate of the lubricant flowing outwardly along the radial grooves.

In this type of tapered-land thrust bearing, a thrust load is borne by a film of lubricant of high pressure formed between the tapered and flat surfaces of the bearing surface and a thrust collar positioned against the bearing surface by rotation of the thrust collar. Owing to the fact that the flow rate of the lubricant flowing outwardly along the radial grooves is restricted by the throttle means as described hereinabove, the lubricant between the thrust collar and the bearing surface has tended to have its temperature increased by rotation of the thrust collar and the lubricant of high temperature has tended to be transferred to the adjacent tapered surface by flowing through each groove. This phenomenon which is generally referred to as hot oil carryover may cause the temperature of the lubricant to rise above the permissible temperature range which is determined by a reduction in the strength of the bearing material, oxidation of the lubricant and other factors. Thus when a thrust bearing is used under high speed and high load conditions, the bearing may sometimes become unfit for use because of seizure.

Meanwhile the aforesaid hot oil carryover also takes place in a pivoted-pad type thrust bearing. A proposal to alleviate the phenomenon is described, for example, in Japanese Patent Publication No. 4130/73 which provides an umbrella sprayer system between the adjacent pads so as to supply cooled lubricant to the leading edge of each pad as well as to scrape off the hot lubricant transferred from the pad of the preceding stage.

When a pivoted-pad type thrust bearing provided with this device is used with a large type rotary machine, such as turbine, compressor, etc., adapted for service under high speed and high load conditions wherein the number of revolutions exceed 15000 rpm and the pressure applied to the bearing surface is as high as 50 kg/cm$^2$, the following problem would be raised. Normal operation of the bearing would require not only a supply of lubricant and an increase in the pressure of the lubricant supplied but also the provision of a lubricant film of a thickness above the minimum level and the restriction of the maximum bearing temperature. In the pivoted-pad type thrust bearing described hereinabove, the pads receive a supply of cooled lubricant but the pads themselves are not cooled. Thus the temperature of the pads themselves would increase and consequently the temperature of the lubricant film between the pads and the thrust collar would also increase. This would cause a reduction in the viscosity of the lubricant film and the thickness of the lubricant film would be reduced and become unable to cope with the high load condition. From the foregoing, it will be understood that it is impossible to let a thrust bearing operate normally under high speed and high load conditions merely by supplying cooled lubricant to the bearing surface.

SUMMARY OF THE INVENTION

An object of this invention is to provide a tapered-land thrust bearing which can withstand uses under high speed and high load conditions.

Another object is to provide a tapered-land thrust bearing of low mechanical losses.

Still another object is to provide a tapered-land thrust bearing which is capable of providing a lubricant film of large thickness while being able to minimize the hot oil carryover phenomenon and reduce the temperature of the lubricant and the bearing surface.

The aforesaid objects are accomplished according to the invention by providing, in a tapered-land thrust bearing having a plurality of radial grooves formed on its bearing surface and the bearing surface between the radial grooves formed with tapered and flat surfaces, a plurality of nozzle holes fed with lubricant at least one of which is formed in one of the radial grooves and disposed in a position close to the leading edge of the respective tapered surface.

Additional and other objects, features and advantages of the invention will become apparent from the description set forth hereinafter when considered in conjuction with the accompanying drawings.

DESCRIPTION OF THE PREFERRED EMBODIMENTS

Figure 1:
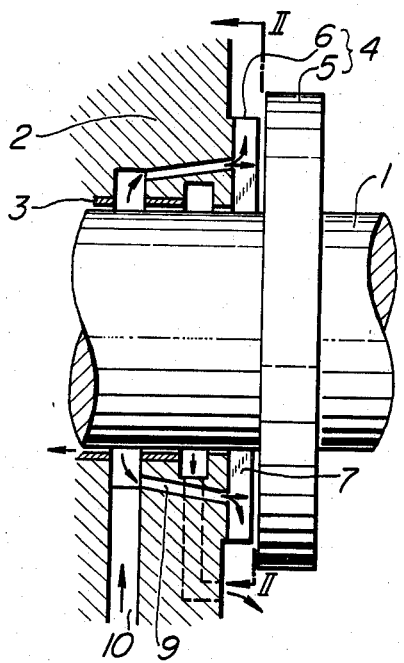
FIG. 1 is a vertical sectional view of the thrust bearing comprising one embodiment of the invention.
Figure 2:
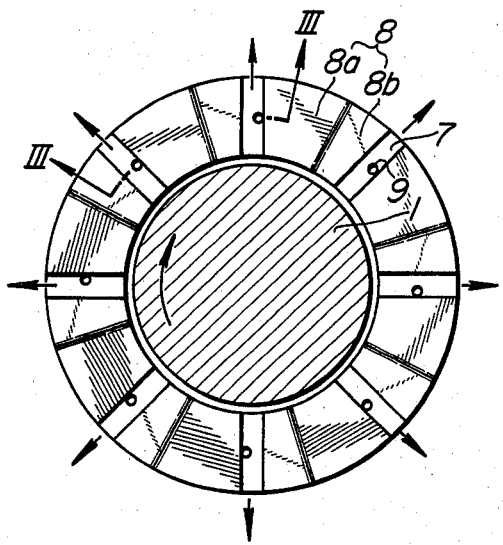
FIG. 2 is a sectional view taken along the line II—II in FIG. 1.
Figure 3:
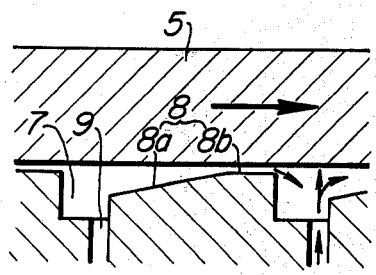
FIG. 3 is a sectional view taken along the line III—III in FIG. 2.

FIGS. 1-3 show one embodiment of the thrust bearing in conformity with the present invention. In the figures, a rotor shaft 1 is supported by a journal bearing 3 and a thrust bearing 4 mounted on a bearing support member 2, and the thrust bearing 4 comprises a thrust collar 5 secured to the rotor shaft 1, and a thrust slide bearing member 6 in sliding contact with the thrust collar 5. The thrust slide bearing member 6 is formed integrally with the bearing support member 2.

The thrust slide bearing member 6 is formed thereon with a bearing surface 8 having plurality of lubricant grooves 7 extending radially thereof as shown in FIG. 2, so that a tapered surface 8a and a flat surface 8b are defined between the adjacent grooves 7. The lubricant grooves 7 are constructed such that they are not provided with throttle means used in the prior art, to facilitate discharge of the lubricant from the grooves 7. Lubricant is supplied to the lubricant grooves 7 and control of the amount of lubricant supplied thereto is effected by means of nozzle holes 9 each formed in one of the lubricant grooves 7. The nozzle holes 9 are maintained in communication with lubricant supply passages 10, and each nozzle hole 9 is arranged such that it opens in the bottom of each lubricant groove 7 in a position close to one of the tapered surfaces 8a so that the supplied lubricant may be quickly introduced to the respective tapered surface 8a.

Operation of the embodiment of the aforesaid construction will be described. Lubricant of low temperature is supplied through the lubricant supply passages 10 and nozzle holes 9 and ejected in jets against the thrust collar 5. At this time, the supplied lubricant cools the thrust bearing surface 8 and reduces the bearing temperature of the thrust bearing surface 8 as it flows through the lubricant supply passages 10 and nozzle holes 9 disposed in the vicinity of the leading edge of each tapered surface 8a. The majority of the lubricant supplied in this way is drawn between the thrust collar 5 and the thrust bearing surface 8 by suction produced by the rotational action of the thrust collar 5, to form a film of lubricant of high pressure therebetween. Part of the lubricant blows off by its jets the lubricant of high temperature exhausted from the flat portion 8b of the thrust bearing surface 8 of the preceding stage, to cause the lubricant of high temperature to be discharged to the outside. Thus the lubricant of high temperature flowing from the flat surface 8b of the preceding stage is prevented from flowing onto the tapered surface 8a of the next following stage, thereby reducing the temperature of the lubricant between the thrust bearing surface 8 and the thrust collar 5.

Figure 4:
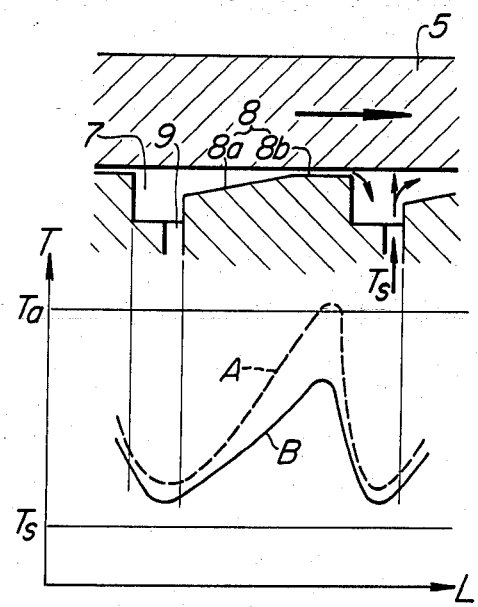
FIG. 4 is a view showing a lubricant temperature distribution obtained in the thrust bearing according to the invention in comparison with a lubricant temperature distribution obtained in a thrust bearing of the prior art.

FIG. 4 shows a reduction in the temperature of the lubricant flowing onto the tapered surface 8a of the thrust bearing according to the invention. In the diagram shown in the figure, the ordinate represents the temperature T and the abscissa indicates the length L of the thrust bearing surface. A curve A represents the lubricant temperature determined in a thrust bearing of the prior art, and a curve B represents the lubricant temperature determined in the thrust bearing according to the invention. As can be seen clearly in the figure, the temperature of the lubricant on tha flat surface 8b of the thrust bearing surface 8 of the conventional thrust bearing exceeds a permissible temperature Ta, but the corresponding lubricant temperature can be kept at a level below the permissible temperature Ta in the thrust bearing according to the invention. Ts designates the temperature of the lubricant just supplied. This reduction in lubricant temperature allows lubrication and cooling of the thrust bearing to be effected satisfactorily, thereby permitting the thrust bearing to be used under high speed and high load conditions. The invention enables a rise in the temperature of the lubricant and the bearing surface to be avoided as aforesaid. This is conductive to reduced decrease in viscosity of the lubricant and increased thickness of the film of lubricant, thereby enabling mechanical losses to be minimized.

Figure 5:
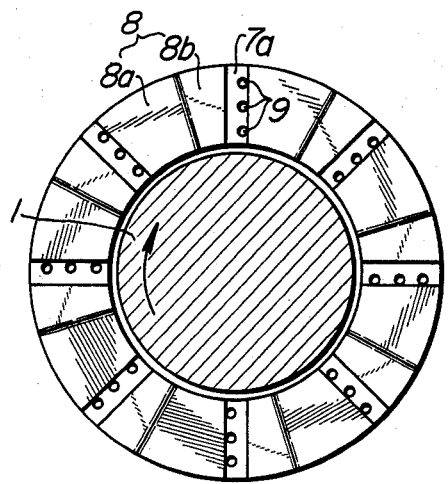
FIG. 5 is a schematic view showing the arrangement of the nozzle holes in another embodiment of the thrust bearing in conformity with the invention.

FIG. 5 shows another embodiment of the invention wherein parts similar to those shown in FIGS. 1-3 are designated by like reference characters. In this embodiment, a plurality of nozzle holes 9 are formed in each of the lubricant grooves 7a in positions close to the leading edge of the respective tapered surface 8a, to thereby further increase the efficiency with which cooling of the thrust bearing is effected.

Figure 6:
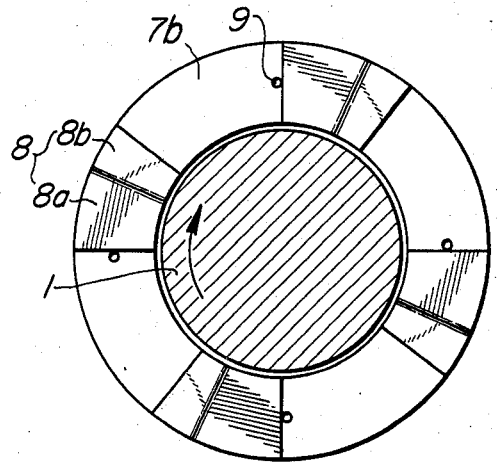
FIG. 6 shows a modification of the lubricant grooves of the thrust bearing according to the invention.

FIG. 6 shows still another embodiment in which the peripheral dimension of the lubricant grooves 7b is increased and the area of the thrust bearing surface 8 is reduced. By this arrangement, mechanical losses caused by the sliding contact of the thrust collar 5 with the thrust bearing surface 8 can be reduced. The peripheral dimension of the lubricant grooves 7b can be determined by taking into consideration the thickness and viscosity of the lubricant film, the peripheral velocity of the thrust collar 5 and the surface pressure of the thrust bearing 4. In this embodiment, the lubricant grooves 7b are shown as being formed with one nozzle hole 9. However, a plurality of nozzle holes 9 may be formed in each lubricant groove 7b.

Figure 7:
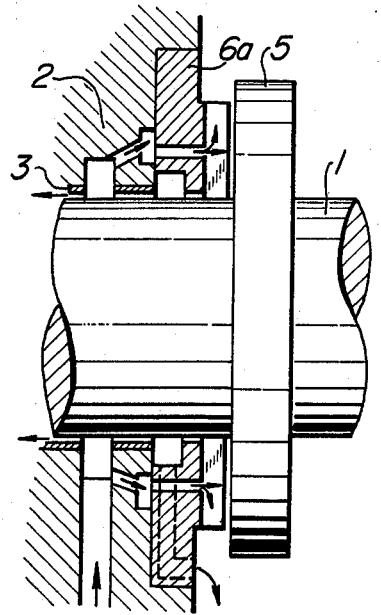
FIG. 7 is a vertical sectional view of one form of the thrust bearing member of the thrust bearing according to the invention.
Figure 8:
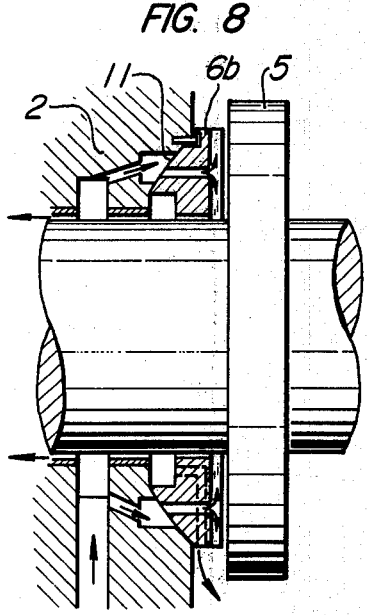
FIG. 8 is a vertical sectional view of another form of the thrust bearing member of the thrust bearing according to the invention.

In the embodiment shown and described hereinabove, the thrust slide bearing member 6a constituting the thrust bearing 4 is formed integrally with the bearing support member 2. However, the invention is not limited to this constructional form and the thrust slide bearing member 6 may, as shown in FIG. 7, be formed separately from and bolted, for example, to the bearing support member 2. Also, as shown in FIG. 8, a spherical seat 11 may be used for mounting the thrust slide bearing member 6b on the bearing support member 2, to avoid uneven contact of the thrust bearing surface 8 with the thrust collar 5.

From the foregoing description, it will be appreciated that the invention can minimize hot oil carryover and reduce the temperatures of the lubricant and the thrust bearing surface. Also, a reduction in the viscosity of the lubricant can be minimized and the thickness of the film of lubricant can be increased. As a result, the thrust bearing according to the invention can withstand uses under high speed and high load conditions and yet is low in mechanical losses. Moreover, fabrication of the thrust bearing is facilitated.

What is claimed is:
1. A tapered-land thrust bearing comprising:
 a bearing surface having a plurality of lands, each of which has a tapered surface followed by a flat surface;
 a plurality of lubricant grooves formed on said bearing surface, each of said grooves extending radially of the bearing surface between the flat surface of a circumferentially preceding land and the tapered surface of a circumferentially following land; wherein the improvement comprises at least one axially oriented lubricant feeding nozzle hole being formed in each of said lubricant grooves, each said nozzle hole having a diameter which is substantially smaller than the width of the lubricant grooves and being disposed in a bottom surface thereof at a position adjoining a leading edge of a tapered surface of the respective following land in a manner forming lubricant jet means for minimizing hot oil carry-over from the flat surface of the respective preceding land to said tapered surface of the following land by causing hot oil from the preceding flat surface to be discharged through the respective lubricant groove within which the nozzle hole is formed.

2. A tapered-land thrust bearing as claimed in claim 1, wherein only one said lubricant feeding nozzle hole is formed in each of said lubricant grooves and is disposed substantially midway between radially opposite ends thereof.

3. A tapered-land thrust bearing as claimed in claim 1, wherein a plurality of lubricant feeding nozzle holes are formed in each said lubricant groove and are disposed in a single row along the length of said groove.

4. A tapered-land thrust bearing comprising:
a bearing surface;
a plurality of lubricant grooves formed on said bearing surface and extending radially thereof; and
a plurality of tapered surfaces and flat surfaces, each tapered surface and each flat surface being disposed between the adjacent lubricant grooves extending radially of the bearing surface; wherein the improvement comprises each of said lubricant grooves having a peripheral dimension greater than the peripheral dimension of the tapered surface and the flat surface interposed between the adjacent lubricant grooves, and a plurality of lubricant feeding nozzle holes formed in said lubricant grooves, at least one of said nozzle holes being disposed close to the respective tapered surface of said bearing surface.

* * * * *